| United States Patent [19]
Dimitri

[11] 3,803,041
[45] Apr. 9, 1974

[54] STABILIZED CLEANSING PASTE
[75] Inventor: Mitchell S. Dimitri, Charleston, S.C.
[73] Assignee: Westvaco Corporation, New York, N.Y.
[22] Filed: Aug. 8, 1972
[21] Appl. No.: 278,813

[52] U.S. Cl.............. 252/171, 252/316, 252/554, 252/DIG. 5
[51] Int. Cl............................................. C11d 7/52
[58] Field of Search ............ 252/171, 8.5, 316, 554, 252/DIG. 5; 260/124

[56] References Cited
UNITED STATES PATENTS

| | | | |
|---|---|---|---|
| 2,392,779 | 1/1946 | Showalter | 252/DIG. 5 |
| 2,525,303 | 10/1950 | Lenoble | 252/DIG. 5 |
| 2,476,845 | 7/1949 | Dawson | 252/8.5 P |
| 3,010,895 | 11/1961 | McIntosh | 252/8.5 P |
| 3,108,068 | 10/1963 | Weiss et al. | 252/8.5 P |
| 2,505,457 | 4/1950 | Bird | 260/124 |

*Primary Examiner*—William E. Schulz
*Attorney, Agent, or Firm*—Ernest B. Lipscomb, III; Richard L. Schmalz

[57] ABSTRACT

A stabilized cleansing paste comprising certain water-immiscible organic solvents, water, and certain water-soluble lignins. The preferred stabilized cleansing paste systems comprise 65–89 percent by weight organic solvent, 10–30 percent weight water, and 1–5 percent by weight water-soluble lignin. The organic solvents contemplated for use in the cleansing pastes of this invention include, among others, Varsol, perchloroethylene, mono-chlorobenzene and benzene. The pastes made according to this invention are useful in cleansing applications to remove grease or oil deposits, such was waterless hand cleaners for garages and degreasing metal surfaces.

5 Claims, No Drawings

STABILIZED CLEANSING PASTE

BACKGROUND OF THE INVENTION

1. Field of the Invention

This invention relates to a stabilized cleansing paste and the method for making same. More particularly, this invention relates to the use of water soluble lignins to make stabilized cleansing pastes containing organic immiscible solvents. In particular this invention relates to an improved waterless hand cleanser.

2. The Prior Art

Typically waterless hand cleansers include, a solvent water, and a gelling agent or emulsifying agent. Waterless hand cleansers are, of course, specialized products which require no water to remove dirt, grime or grease from the hands. This does not however, means that water does not enter into the composition but that they are designed for use where no water supply is available or convenient. A detailed discussion of waterless hand cleansers may be found in the text Modern Chemical Specialities by Milton A Lesser, McNair-Dorland Comapny (New York 1950). In chapter 3, "Waterless Hand Cleansers," this text describes the waterless hand cleanser as containing enough soap to give the cleanser a jelly-like consistency. The subject invention on the other hand, contains no soaps. However, lignin is known as a stabilizing and emulsifying agent and is quite competitive with commercial emulsifiers by stabilizing certain oil and water emulsions. However, prior to this application no use of lignin as a stabilizer in a waterless hand cleanser has been known. A brief discussion of the use of lignin emulsifiers appears in the text *Lignins, Occurrence, Formation, Structure and Reactions*, edited by Sarkanen and Ludwick (Wiley-Interscience, 1971) at page 851.

It is therefore a general object of this invention to provide a stabilized cleansing paste. It is a further object of this invention to stabilize a cleansing paste with water-soluble lignins. Another object of this invention is to provide an improved waterless hand cleanser.

Other objects, features and advantages of this invention may be seen in the foregoing detailed discussion.

SUMMARY OF THE INVENTION

It has been found that a stabilized cleansing paste may be prepared by mixing the following under high shear: 65–89 percent by total weight of certain immiscible organic solvent; 10–30 percent by total weight of the paste of water; and 1–5 percent of the total weight of the paste of a water-soluble lignin. The immiscible organic solvents contemplated for use in the subject invention include, among others, Varsol, perchloroethylene, mono-chlorobenzene and benzene. The lignins contemplated for use in the subject invention are water-soluble lignins.

DETAILED DESCRIPTION OF THE INVENTION

It has been found that a stabilized cleansing paste may be produced by using high shear mixing, as in a Waring blender, Homomixer, colloid mill, etc., according to the following process. First, a dry water-soluble lignin is added to an immiscible organic compound and agitated to disperse the lignin particles. Next, it is essential that when the dispersion is complete the requisite amount of water is rapidly added under high shear conditions. Usually, only one to two minutes is needed. Finally, as mixing continues, the viscosity increases slightly for a few minutes and then the entire system gels in a matter of seconds to a smooth, homogeneous paste. It has been found that the pastes of this invention remain stable for long periods of time, i.e., more than 1 year.

The cleansing paste contains from 65 to 89 percent by total paste weight of a water-immiscible organic solvent, preferably 70 to 80 percent by weight. If more than 89 percent water-immiscible solvent is used gelling becomes very difficult as insufficient lignin and water are present; whereas, when less than 65 percent water-immiscible solvent is used the excess water and lignin present prevent proper gelling. The water may be present in an amount of 10 to 30 percent by weight. The immiscible organic solvents contemplated for use in this invention include primarily straight chain hydrocarbons but are not limited thereto. For example, especially satisfactory solvents include, perchloroethylene, monochlorobenzene, benzene, xylene, toluene, turpentine, gasoline, No. 2 Fuel Oil, carbon tetrachloride, chloroform and Varsol.

The lignins employed to make the cleansing pastes of this invention include alkali lignins from the kraft pulping process and lignins derived from other alkaline processes such as the soda or modified soda processes and sulfonated lignins, such as sulfite lignins from acid and neutral processes and sulfontated alkali lignins. One of the main sources of lignin is the residual pulping liquors of the pulp industry where lignocellulosic materials such as wood, straw, corn stalks, bagasse, and the like are processed to separate the cellulose or pulp from the lignin. For example, the black liquor obtained from the kraft, soda and other alkali processes is not recovered as a sulfonated product by may easily be sulfonated, if desired, by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "hydrotropic lignins" derived from hydrotropic pulping processes may be sulfonated and used. By the term "sulfonated lignin," it is meant a lignin containing at least an effective amount of sulfonate groups to solubilize the lignin in water at neutral or acid conditions. The degree of sulfonation present in the lignin is not a controlling factor in making the adduct but may be used to tailor the adduct to have desired characteristics, with a low degree of sulfonation being preferred, i.e., 1 mole per 1,000 grams of lignin or lower. The amount of lignin to be used in the composition may vary from 1 to 5 percent of the total weight of the paste composition. Generally, at least 1 percent by weight of lignin is needed to obtain the proper gel.

These pastes are very useful in cleansing application to remove grease or oily deposits such as in hand cleaners for garage and degreasing metal surfaces.

The practice of this invention may be seen in the foregoing example. To illustrate the various proportions of solvent to water to lignins and the types of solvent and lignin necessary to obtain a stabilized cleansing paste, a number of cleansing pastes were made. The ratios, solvents and lignins used are shown in the table along with the weight of each ingredient. The procedure used was to add the lignin to the solvent and disperse throughout. The water was quickly added under high shear mixing, and mixing was continued for about two minutes. The lignin used as the stabilizing agent, except where indicated otherwise was the water-soluble sodium salt of alkali lignin. Commercial lignins of this type include Indulin B and Indulin C, sold by Westvaco Corporation.

Samples 1-11 show 11 different solvents that form stabilized cleansing pastes. Samples 11-16 using Varsol as the solvent outline the parameters of stabilized cleansing pastes. Portions of compositions 11 and 14 were placed in a quart jar and stored. At the end of one year the composition remained stable and served as satisfactory waterless hand cleaners.

While the invention has been described and illustrated herein by references to various specific materials, procedures and examples, it is understood that the invention is not limited to the particular materials compositions of materials, and procedures selected for that purpose. Numerous variations of such details can be employed, as will be appreciated by those skilled in the art.

What is claimed is:

1. A stabilized cleansing paste consisting essentially of, 65-89 percent, by weight of a water-immiscible organic solvent, 10-30 percent by weight water, and 1-5 percent by weight of a water-soluble lignin, said paste having been subjected to high shear mixing to form a stabilized gel.

2. The composition of claim 1 wherein said water-immiscible organic solvent is a member of the group consisting of straight chain petroleum solvents, perchlorethylene, monochlorbenzene, benzene, turpentine, gasoline, fuel oil, carbon tetrachloride and chloroform.

3. The composition of claim 1 wherein said lignin is an alkali lignin.

4. The composition of claim 1 wherein said lignin is a sulfonated lignin.

5. The composition of claim 1 wherein said composition contains 70-80 percent by weight of said water immiscible organic solvent.

TABLE I

| Sample No. | | Solvent Percent | Solvent Weight, gms. | Water Percent | Water Weight, gms. | Lignin Percent | Lignin Weight, gms. | Gel | No Gel |
|---|---|---|---|---|---|---|---|---|---|
| 1 | Xylene | 75 | 300 | 20 | 80 | 5 | 20 | X | |
| 2 | Toluene | 75 | 300 | 20 | 80 | 5 | 20 | X | |
| 3 | Turpentine | 75 | 300 | 20 | 80 | 5 | 20 | X | |
| 4 | Gasoline | 75 | 300 | 20 | 80 | 5 | 20 | X | |
| 5 | No. 2 Fuel Oil | 75 | 300 | 20 | 80 | 5 | 20 | X | |
| 6 | Carbon Tetrachloride | 80 | 320 | 15 | 60 | 5 | 20 | X | |
| 7 | Chloroform | 80 | 320 | 15 | 60 | 5 | 20 | X | |
| 8 | Benzene | 75 | 300 | 20 | 80 | 5 | 20 | X | |
| 9 | Perchloroethylene | 76.4 | 306 | 18.8 | 75.2 | 4.7 | 18.8 | X | |
| 10 | Mono-chlorobenzene | 75 | 300 | 20 | 80 | 5 | 20 | X | |
| 11 | Varsol | 75 | 300 | 22.5 | 90 | 2.5 | 10 | X | |
| 12 | Varsol | 75 | 300 | 20 | 80 | 5 | 20 | X | |
| 13 | Varsol | 80 | 320 | 19 | 76 | 1 | 4 | X | |
| 14 | Varsol | 65 | 260 | 30 | 120 | 5 | 20 | X | |
| 15 | Varsol | 80 | 320 | 15 | 60 | 5 | 20 | X | |
| 16 | Varsol | 55 | 340 | 10 | 40 | 5 | 20 | | X |

Notes: The lignin used for these samples was Indulin B samples 1-5 and 11; Indulin C for samples 6-10 and 13-16; and Polyfon H, a sulfonated alkali lignin for sample 12.

* * * * *